Oct. 11, 1955     G. KULL     2,720,412
STORAGE BATTERY LIFTER AND CARRIER
Filed June 4, 1952
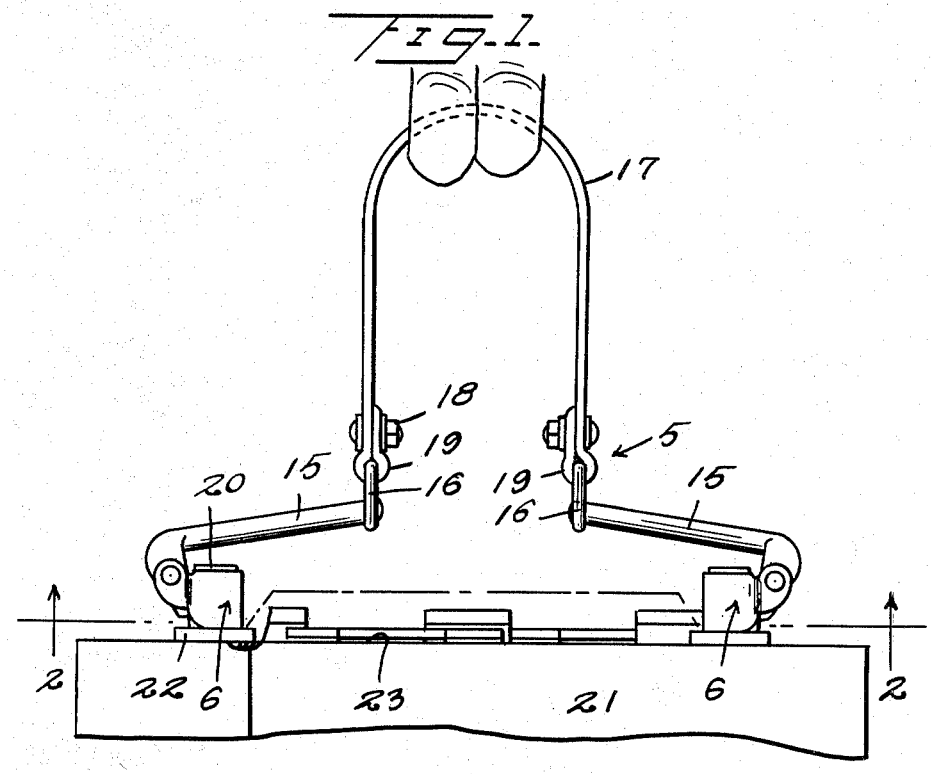
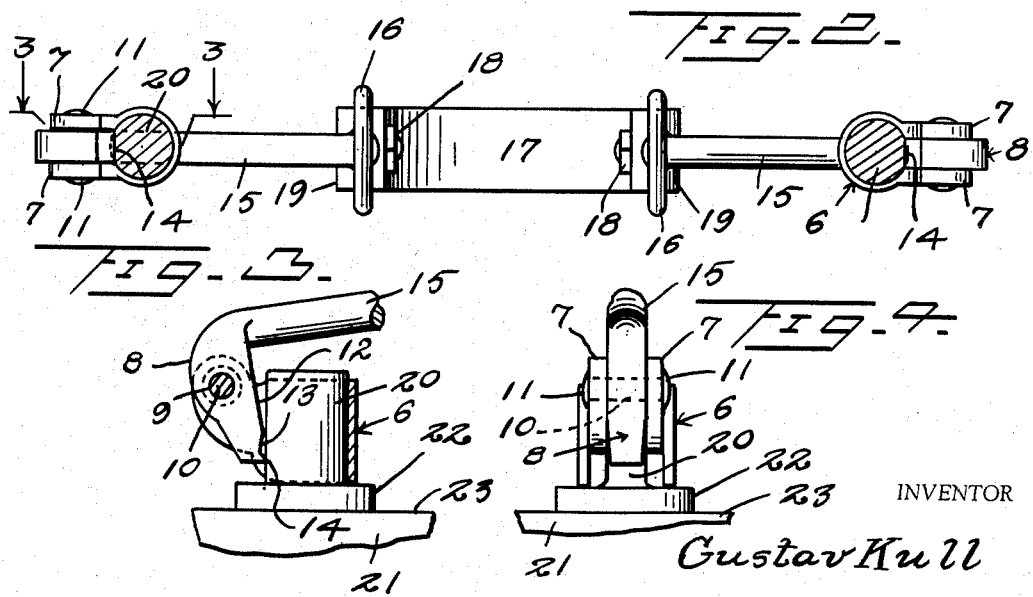
INVENTOR
Gustav Kull
BY John H. Randolph
ATTORNEY

United States Patent Office 2,720,412
Patented Oct. 11, 1955

2,720,412

STORAGE BATTERY LIFTER AND CARRIER

Gustav Kull, Sacred Heart, Minn.

Application June 4, 1952, Serial No. 291,702

4 Claims. (Cl. 294—92)

This invention relates to a novel lifter and carrier for storage batteries and has for its primary object to provide a battery lifter and carrier which is so constructed that no leverage or prying force will be exerted against the battery posts engaged by the device and which commonly results in the battery posts being broken loose from the top of the battery case and the utility of the battery thereby destroyed.

More particularly, it is an aim of the present invention to provide a battery lifter and carrier having gripping means to which the battery posts are effectively clamped at the bases of the battery posts and wherein an upward lifting force on the carrier is transmitted to the battery post clamping units through points spaced more remotely apart than the battery posts so that a direct upward pull is exerted against each battery post, thereby minimizing any force exerted on the post which would tend to rock the post and break it loose from the battery casing top.

Various other objects and advantages of the invention will hereinafter become more fully apparent from the following description of the drawing, illustrating a presently preferred embodiment thereof, and wherein:

Figure 1 is a side elevational view showing the battery lifter and carrier in an applied position;

Figure 2 is a horizontal sectional view thereof taken substantially along a plane as indicated by the line 2—2 of Figure 1;

Figure 3 is an enlarged fragmentary vertical sectional view taken substantially along a plane as indicated by the line 3—3 of Figure 2, and Figure 4 is an end elevational view looking toward the outer side of one of the battery post clamping units or from left to right of Figure 3.

Referring more specifically to the drawing, the battery lifter and carrier in its entirety is designated generally 5 and includes a pair of corresponding relatively wide battery post engaging split sleeves, each designated generally 6. Each sleeve 6 is provided with a pair of substantially parallel ears 7 which project outwardly and upwardly therefrom and which are spaced a substantial distance apart to define a split or gap in the sleeve 6. A clamping jaw 8, which is relatively long, has an intermediate portion loosely disposed between the ears 7 of each sleeve 6 and which intermediate portion is provided with an opening 9 through which a pivot pin or bolt 10 loosely extends. The pivot pin or bolt 10 extends outwardly through the ears 7 and has flattened heads 11 disposed against the outer sides of said ears. The jaw 8 extends downwardly from the pivot 10 between the ears 7 to a point above the bottom edge of the sleeve 6, as clearly illustrated in Figures 3 and 4, and the inner edge 12 of the jaw 8 is provided adjacent its lower end with a longitudinally elongated notch 13, the bottom portion of which merges with the bottom edge of the jaw 8 to form a sharpened edge 14 which extends inwardly with respect to the sleeve 6 and which is adapted to bite into a battery post, as will hereinafter be described. The edge 14, as seen in Figure 3, is disposed a substantial distance below the axis of the pivot 10. The jaw 8 extends upwardly from the pivot 10 to substantially above the upper edge of the sleeve 6 and to above the upper edges of the ears 7. A relatively long lever arm 15 has one end formed integral with the upper end of the jaw 8 and extends from the inner edge 12 of said jaw, preferably at substantially a right angle to said edge 12. The opposite end of the lever arm 15 is provided with a loop 16 which is disposed transversely of the axis of the lever arm and which extends upwardly therefrom.

It will be understood that each sleeve 6 has a jaw 8 pivotally mounted between the ears 7 thereof and that each jaw 8 has a lever arm 15 projecting from the inner side of its upper end, so that the lever arms 15 are normally disposed over and extend across the upper edges of the sleeves 6. A lifting and carrying strap 17, forming the handle of the battery lifter and carrier 5, has turned back ends extending through the loops 16 and secured by suitable fastening means 18 to form loops 19 in the end portions of the strap 17 which interengage with the loops 16. The strap 17 is preferably formed of a flexible, relatively nonelastic material such as leather.

From the foregoing it will be readily apparent that when no upward pull is being exerted on the strap 17, the leverage afforded by the length of the lever arms 15 will cause said lever arms to swing downwardly against the upper edges of the portions of the sleeves 6 which are disposed remote to the ears 7, so that the jaws 8 will thus be swung about the pivots 10 in a direction to cause portions of the jaws disposed below said pivots to swing outwardly with respect to the sleeves 6 and substantially beyond the position of the lower end of the jaw 8 as illustrated in Figure 3, and so that the sharpened edge 14 will be displaced outwardly a substantial distance from its position of Figures 2 and 3. With the lever arms 15 and jaws 8 thus disposed, the sleeves 6 may be readily slipped over the two terminal posts 20 of a storage battery 21, the upper portions only of which are illustrated, and so that the bottom edges of the sleeves 6 will rest upon the collars or bases 22 disposed around the lower ends of the battery posts 20 and against the top surface 23 of the battery 21. With the sleeves 6 thus applied to the battery posts 20, the arms 15 will extend inwardly across the upper ends of the battery post sleeves toward one another, as illustrated in Figure 1. By then lifting upwardly on the strap 17, as by engagement of the intermediate portion thereof with the fingers or hand, the lever arms 15 will be initially rocked upwardly about their pivots 10 to swing the lower portions of the jaws 8 toward the posts 20 and inwardly of the sleeves 6. The inner edges of the bottom ends forming the sharpened edges 14 will bite into the battery posts 20 to effectively clamp the battery posts between the inner edges of the lower portions of the jaws 8 and the sleeve portions which are disposed remote thereto, after which, since the arms 15 will be prevented from swinging upwardly beyond their positions of Figure 1 by engagement of the lower ends of the jaws 8 with the battery posts 20, additional upward pull on the strap 17 will lift the battery 21 by the posts 20. It will be readily obvious that the lifting force will actually be exerted upwardly along vertical lines extending through the pivots 10 and between which the posts 20 are disposed and as the sleeves 6 may not swing downwardly with respect to the posts 20, no prying or leverage force will be exerted against the posts but rather a direct upward pull for lifting the storage battery 21. The lifter and carrier 5 will effectively grip the posts 20 so that the battery 21 may be carried any distance without danger of the lifter releasing the posts 20. Furthermore, it will be readily apparent that no lifting force will be exerted on the battery posts 20 until after the jaw ends of the jaws 8 have been swung inwardly to effectively grip and clamp the battery posts between said lower jaw ends and the sleeves 6, so that regardless of how quick an upward pull is exerted on the strap 17 the posts will be effectively clamped before any lifting force is exerted thereon. Furthermore, due to the length of the lever arms 15, considerable leverage will be exerted on the lower ends of the jaws 8 to effectively maintain them in gripping engagement with the posts 20 to prevent any slippage of the jaws and sleeves 6 relatively to said posts. By merely releasing the upward pull on the handle 17, the lever arms 15 will swing downwardly from their positions of Figure 1 to release the posts 20 from clamping engagement with the sleeves and jaws so that the sleeves may be lifted off of said posts. It will also be readily apparent that effective engagement may be obtained on battery posts which are worn or of irregular shape due to the substantial area of the post engaged by the sleeve 6 and the leverage force exerted by the lever arm 15 to maintain the lower portion of the jaw 8 in tight gripping engagement with the battery post.

Various modifications and changes are contemplated and may obviously be resorted to, without departing from the spirit or scope of the invention as hereinafter defined by the appended claims.

I claim as my invention:

1. A storage battery lifter and carrier comprising a pair of storage battery terminal posts engaging split sleeves, said sleeves being relatively wide and each having a pair of spaced substantially parallel ears projecting outwardly therefrom and defining the gap in the sleeve, an elongated jaw member individual to each sleeve having a lower portion loosely disposed between the ears of the pair of ears thereof, a pivot element mounted in said ears and extending through and loosely engaging said jaw member intermediate of its ends, each jaw member having a lower end extending substantially below the jaw pivot and swingable inwardly of said sleeve through the sleeve gap, the opposite, upper end of said jaw member extending above the upper edges of the ears and the upper edge of the sleeve, a lever arm extending from the upper end of each jaw member at an angle thereto, said lever arms extending across the upper ends of the sleeves, and a flexible handle member having end portions connected to the adjacent, free ends of said lever arms, said lever arms being swingable downwardly to adjacent the upper edges of the sleeves for swinging the lower ends of the jaws outwardly of the sleeves, said sleeves being adapted to engage over a pair of storage battery terminal posts, said handle member being displaceable upwardly for rocking the lever arms upwardly about the jaw pivots for initially swinging the lower ends of the jaws inwardly of the sleeves for clamping the battery posts between the lower ends of said jaws and the sleeve portions disposed remote therefrom and for thereafter exerting an upward pull on the jaws and sleeve portions along vertical lines extending through the jaw pivots for lifting and supporting the battery, the bottom edges of said sleeves being adapted to rest on collars or bases surrounding the lower ends of the battery posts, and the lower ends of said gripping jaws being disposed above the level of the bottom edges of said sleeves.

2. A storage battery lifter and carrier comprising a pair of storage battery terminal posts engaging split sleeves, said sleeves being relatively wide and each having a pair of spaced substantially parallel ears projecting outwardly therefrom and defining the gap in the sleeve, an elongated jaw member individual to each sleeve having a lower portion loosely disposed between the ears of the pair of ears thereof, a pivot element mounted in said ears and extending through and loosely engaging said jaw member intermediate of its ends, each jaw member having a lower end extending substantially below the jaw pivot and swingable inwardly of said sleeve through the sleeve gap, the opposite, upper end of said jaw member extending above the upper edges of the ears and the upper edge of the sleeve, a lever arm extending from the upper end of each jaw member at an angle thereto, said lever arms extending across the upper ends of the sleeves, and a flexible handle member having end portions connected to the adjacent, free ends of said lever arms, said lever arms being swingable downwardly to adjacent the upper edges of the sleeves for swinging the lower ends of the jaws outwardly of the sleeves, said sleeves being adapted to engage over a pair of storage battery terminal posts, said handle member being displaceable upwardly for rocking the lever arms upwardly about the jaw pivots for initially swinging the lower ends of the jaws inwardly of the sleeves for clamping the battery posts between the lower ends of said jaws and the sleeve portions disposed remote therefrom and for thereafter exerting an upward pull on the jaws and sleeve portions along vertical lines extending through the jaw pivots for lifting and supporting the battery, said ears extending outwardly and upwardly from the sleeves, and said jaw pivots being disposed adjacent the level of the upper edges of the sleeves.

3. A storage battery lifter and carrier comprising a pair of storage battery terminal posts engaging split sleeves, said sleeves being relatively wide and each having a pair of spaced substantially parallel ears projecting outwardly therefrom and defining the gap in the sleeve, an elongated jaw member individual to each sleeve having a lower portion loosely disposed between the ears of the pair of ears thereof, a pivot element mounted in said ears and extending through and loosely engaging said jaw member intermediate of its ends, each jaw member having a lower end extending substantially below the jaw pivot and swingable inwardly of said sleeve through the sleeve gap, the opposite, upper end of said jaw member extending above the upper edges of the ears and the upper edge of the sleeve, a lever arm extending from the upper end of each jaw member at an angle thereto, said lever arms extending across the upper ends of the sleeves, and a flexible handle member having end portions connected to the adjacent, free ends of said lever arms, said lever arms being swingable downwardly to adjacent the upper edges of the sleeves for swinging the lower ends of the jaws outwardly of the sleeves, said sleeves being adapted to engage over a pair of storage battery terminal posts, said handle member being displaceable upwardly for rocking the lever arms upwardly about the jaw pivots for initially swinging the lower ends of the jaws inwardly of the sleeves for clamping the battery posts between the lower ends of said jaws and the sleeve portions disposed remote therefrom and for thereafter exerting an upward pull on the jaws and sleeve portions along vertical lines extending through the jaw pivots for lifting and supporting the battery, said jaws each having an inner edge normally facing inwardly of the adjacent sleeve, each inner jaw edge having a notch adjacent its lower end including an outwardly and downwardly inclined bottom surface converging with the lower end of the jaw and forming a transverse sharpened edge at the lower end and inner side of the jaw, adapted to penetrate the battery post when the lower end of the jaw is swung inwardly of the sleeve.

4. A battery lifter and carrier as in claim 3, said lever arms being disposed substantially at right angles to the inner edges of the jaws.

References Cited in the file of this patent

UNITED STATES PATENTS

| | | |
|---|---|---|
| 1,915,197 | Morgan | June 20, 1933 |
| 1,980,746 | Borchert | Nov. 13, 1934 |
| 2,126,605 | Berry | Aug. 9, 1938 |
| 2,294,542 | Chulick et al. | Sept. 1, 1942 |
| 2,584,902 | Miller | Feb. 5, 1952 |